US012734092B2

(12) United States Patent
Vergara et al.

(10) Patent No.: US 12,734,092 B2
(45) Date of Patent: Sep. 15, 2026

(54) TREATMENT OF OSTEOPENIA AND OSTEOPOROSIS AND STIMULATING BONE GROWTH

(71) Applicant: Bone Health Technologies, Inc., Redwood City, CA (US)

(72) Inventors: Alexander Vergara, San Francisco, CA (US); Daniel R. Burnett, San Francisco, CA (US); Shane Mangrum, Ammon, ID (US); Evan S. Luxon, Omaha, NE (US); Alex Yee, San Francisco, CA (US)

(73) Assignee: Bone Health Technologies, Inc., Redwood City, CA (US)

( * ) Notice: Subject to any disclaimer, the term of this patent is extended or adjusted under 35 U.S.C. 154(b) by 0 days.

(21) Appl. No.: 16/150,031

(22) Filed: Oct. 2, 2018

(65) Prior Publication Data

US 2019/0053968 A1 Feb. 21, 2019

Related U.S. Application Data

(63) Continuation of application No. PCT/US2016/026410, filed on Apr. 7, 2016.

(51) Int. Cl.
*A61H 1/00* (2006.01)
*A61H 11/00* (2006.01)
*A61H 23/02* (2006.01)

(52) U.S. Cl.
CPC ............... *A61H 1/00* (2013.01); *A61H 11/00* (2013.01); *A61H 23/02* (2013.01);
(Continued)

(58) Field of Classification Search
CPC .......... A61H 1/00; A61H 11/00; A61H 23/02; A61H 2201/0188; A61H 2201/0192;
(Continued)

(56) References Cited

U.S. PATENT DOCUMENTS 4,098,266 A * 7/1978 Muchisky .......... A61H 23/0263
601/108
4,570,927 A * 2/1986 Petrofsky ............... A61H 23/02
601/36

(Continued)

FOREIGN PATENT DOCUMENTS

JP 2008-534076 8/2008
JP 2008-536527 9/2008

(Continued)

OTHER PUBLICATIONS

Coughlin et al. Fluid shear stress in trabecular bone marrow due to low-magnitude high-frequency vibration. Journal of Biomechanics 45(2012):2222-2229.

(Continued)

*Primary Examiner* — Rachel T Sippel
*Assistant Examiner* — Jacqueline M Pinderski
(74) *Attorney, Agent, or Firm* — Levine Bagade Han LLP

(57) ABSTRACT

An apparatus for the treatment or prevention of osteopenia and osteoporosis, stimulating bone growth, preserving or improving bone mineral density, and inhibiting adipogenesis is described where one embodiment may comprise a motor configured to be in vibrational conductance with an area of the subject, one or more sensors in communication with the motor for receiving feedback relating to the vibrational conductance, and a controller in communication with the motor. The controller may be configured to receive the feedback through the one or more sensors and determine an amount of vibrational conductance transmitted to the area of the subject such that the feedback is correlated to a fit of the motor relative to the area of the subject. Additionally, the controller may be further configured to adjust one or more parameters of the motor in response to the correlated fit until
(Continued)

the feedback is optimized within a predetermined range for treatment.

37 Claims, 9 Drawing Sheets

(52) U.S. Cl.
CPC ................ *A61H 2201/0184* (2013.01); *A61H 2201/0188* (2013.01); *A61H 2201/0192* (2013.01); *A61H 2201/1626* (2013.01); *A61H 2201/163* (2013.01); *A61H 2201/165* (2013.01); *A61H 2201/1654* (2013.01); *A61H 2201/5005* (2013.01); *A61H 2201/5061* (2013.01); *A61H 2201/5084* (2013.01); *A61H 2205/081* (2013.01); *A61H 2205/088* (2013.01)

(58) Field of Classification Search
CPC .... A61H 2201/1654; A61H 2201/1626; A61H 2201/163; A61H 2201/0184; A61H 2205/088; A61H 2201/165; A61H 2201/5005; A61H 2201/5061; A61H 2201/5084; A61H 2205/081; A61H 1/006; A61H 11/02; A61H 2201/0165
See application file for complete search history.

(56) References Cited

U.S. PATENT DOCUMENTS

| | | | | |
|---|---|---|---|---|
| 5,103,806 | A * | 4/1992 | McLeod .................. | A61N 7/00<br>601/2 |
| 6,093,164 | A * | 7/2000 | Davis ................. | A61H 23/0263<br>601/46 |
| 6,183,426 | B1 * | 2/2001 | Akisada ............... | A61B 5/6843<br>310/316.01 |
| 8,545,416 | B1 | 10/2013 | Kayyali et al. | |
| 9,609,921 | B1 * | 4/2017 | Feinstein ............. | A44C 5/2071 |
| 2006/0047230 | A1 * | 3/2006 | Talish .................... | A61H 23/02<br>601/46 |
| 2006/0122544 | A1 * | 6/2006 | Ciluffo ............... | A41D 13/1281<br>601/15 |
| 2008/0177232 | A1 | 7/2008 | Knighton et al. | |
| 2009/0112134 | A1 * | 4/2009 | Avni .................. | A61H 23/0263<br>601/15 |
| 2011/0295083 | A1 | 12/2011 | Doelling et al. | |
| 2013/0072786 | A1 | 3/2013 | Keogh et al. | |
| 2013/0218058 | A1 * | 8/2013 | Ceoldo .................. | A61H 23/00<br>601/46 |
| 2013/0231584 | A1 | 9/2013 | Burnett et al. | |
| 2013/0273490 | A1 | 10/2013 | Way et al. | |
| 2014/0303458 | A1 * | 10/2014 | Paydarfar ............ | A61B 5/4836<br>600/301 |
| 2015/0173943 | A1 | 6/2015 | Loomas et al. | |
| 2015/0272805 | A1 | 10/2015 | Burnett et al. | |
| 2016/0074278 | A1 * | 3/2016 | Muench ............ | A61H 23/0245<br>601/46 |
| 2016/0120734 | A1 * | 5/2016 | Ishikawa ................... | A45F 3/04<br>601/151 |
| 2016/0213548 | A1 * | 7/2016 | John .................... | A61H 1/0244 |
| 2018/0092794 | A1 * | 4/2018 | Murakami ........... | A61H 1/0262 |
| 2018/0247036 | A1 * | 8/2018 | Vincent ............... | H04W 12/065 |

FOREIGN PATENT DOCUMENTS

| | | |
|---|---|---|
| JP | 2009-106537 A | 5/2009 |
| JP | 2009-545416 | 12/2009 |
| JP | 2014-505571 | 3/2014 |
| JP | 2014-506521 A | 3/2014 |
| JP | 2019-513523 | 12/2022 |
| WO | WO 2006/077572 | 7/2006 |
| WO | WO 2009/150685 | 12/2009 |
| WO | WO 2014/099527 | 6/2014 |
| WO | WO 2017/087370 | 5/2017 |

OTHER PUBLICATIONS

National Osteoporosis Foundation (NOF): America's bone health: The state of osteoporosis and low bone mass in our nation. Washington DC, National Osteoporosis Foundation, 2002.

Prioreschi et al. Whole Body Vibration Increases Hip Bone Mineral Density in Road Cyclists. Int J Sports Med 2012; 33:593-599.

Rubin et al. Adipogenesis is inhibited by brief, daily exposure to high-frequency, extremely low-magnitude mechanical signals. PNAS. Nov. 6, 2007; 104(45):17879-17884.

Rubin et al., Transmissibility of 15-Hertz to 35-Hertz Vibrations to the Human Hip and Lumbar Spine: Determining the Physiologic Feasibility of Delivering Low-Level Anabolic Mechanical Stimuli to Skeletal Regions at Greatest Risk of Fracture Because of Osteoporosis. Spine, 28:2621-2627, 2003.

Slatkovska et al. Effect of 12 Months of Whole-Body Vibration Therapy on Bone Density and Structure in Postmenopausal Women. Am J, 10 Phys Med Rehabil 2010; 89:997-1009, Ann Intern Med 2011; 155:668-679.

Song et al. Whole Body Vibration Effects on Body Composition in the Postmenopausal Korean Obese Women: Pilot Study. Korena J Fam Med. 2011; 32:399-405.

Verschueren et al. Effect of 6-Month Whole Body Vibration Training on Hip Density, Muscle Strength, and Postural Control in Postmenopausal Women: A Randomized Controlled Pilot Study. Journal of Bone and Mineral Research, 19:352-359, 2004.

* cited by examiner

TREATMENT OF OSTEOPENIA AND OSTEOPOROSIS AND STIMULATING BONE GROWTH

CROSS-REFERENCE TO RELATED APPLICATIONS

This application is a continuation of PCT/US2016/026410 filed Apr. 7, 2016, which is herein incorporated by reference in its entirety for all purposes.

FIELD OF THE INVENTION

The present invention relates generally to the stimulation of bone growth, healing of bone tissue, and treatment and prevention of osteopenia, osteoporosis, and chronic back pain, and to preserving or improving bone mineral density, and to inhibiting adipogenesis particularly by the application of repeated mechanical loading to bone tissue.

INCORPORATION BY REFERENCE

All publications and patent applications mentioned in this specification are herein incorporated by reference to the same extent as if each such individual publication or patent application were specifically and individually indicated to be so incorporated by reference.

BACKGROUND OF THE INVENTION

Low bone mineral density (BMD) and osteoporosis are significant problems facing the elderly, leading to 1.5 million fractures in 2002 (National Osteoporosis Foundation (NOF): America's bone health: The state of osteoporosis and low bone mass in our nation. Washington D.C., National Osteoporosis Foundation, 2002). Bisphosphonates, a class of compounds that generally inhibit the digestion of bone, have been used for over a decade to treat osteoporosis with significant success but cause unwanted side effects including osteonecrosis of the jaw, erosion of the esophagus, and atypical femoral fractures, which has led to the reconsideration of the use of bisphosphonate therapy.

One alternative to treat osteoporosis has been the use of Whole Body Vibration (WBV), which consists of repeated mechanical loading of bone tissue through vibration devices, using relatively high frequencies (e.g. 15-90 Hz) and relatively low mechanical loads (e.g. 0.1-1.5 g's). Studies have shown that WBV can delay and/or halt the progression of osteoporosis (Rubin et. al., Journal of Bone and Mineral Research, 19:343-351, 2004). In another randomized study, in which ≥0.6 g's of vibratory force were delivered to the feet of the patient, it was demonstrated that WBV was effective in improving hip BMD outcomes as compared to control groups that either did not exercise or were part of an exercise program (Verschueren et al., Journal of Bone and Mineral Research, 19:352-359, 2004).

Related studies have demonstrated the ability of WBV to improve hip and preserve spine BMD in populations of healthy cyclists, postmenopausal women and disabled children (Am J Phys Med Rehabil 2010; 89:997-1009, Ann Intern Med 2011; 155:668-679, J Bone and Mineral Research 2011; 26(8):1759-1766).

The mechanism by which WBV influences BMD is an issue of some debate but studies have suggested that the shear stress within bone marrow in trabecular architecture during high frequency vibration could provide the mechanical signal to marrow cells that leads to bone anabolism (Journal of Biomechanics 45(2012):2222-2229). More specifically, shear stress above 0.5 Pa is mechanostimulatory to osteoblasts, osteoclasts and mesenchymal stem cells (Journal of Biomechanics 45(2012):2222-2229).

Many conventional methods of promoting bone tissue growth and bone maintenance by the application of WBV generally tend to apply relatively high frequency (e.g. 15-90 Hz) and relatively low magnitude mechanical loads (e.g. 0.1-1.5 g's) to bodily extremities, such as the use of vibrating platforms upon which a user stands that apply repeated mechanical loads to the feet of a user. Current WBV vibration platforms (e.g. Galileo 900/2000™, Novotec Medical, Pforzheim, Germany; or Power Plate™, Amsterdam, The Netherlands) and associated treatment regimens require the user to stand on a platform for up to 30 minutes a day, which is inconvenient for many users. Furthermore, applying vibration to the feet of the patient is an inefficient method for mechanically loading the hips, femur, and spine, the targeted areas for WBV therapy for osteoporosis. Up to 40% of vibration power is lost between the feet and the hips and spine due to mechanical damping in the knees and ankles (Rubin et al., Spine (Phila Pa. 1976), 28:2621-2627, 2003).

One other issue with current WBV platforms is the directionality of applied force. Standing on a vibrating platform, an individual receives WBV stimulus in a plane perpendicular to the spine and long bones of hip. Studies have shown that vibrations applied "in the inferior-superior direction would be misaligned with the principal trabecular orientation in the greater trochanter and femoral neck, resulting in lower shear. In contrast, trabeculae in the lumbar spine are aligned with the direction of vibration and the permeability is higher" (Journal of Biomechanics 45(2012):2222-2229).

There is a need for a more efficient and easy to use source of mechanical vibration that delivers around 0.6 g of force directly to the spine and hips. A more efficient method for delivering vibration force would be to reduce the load applied to the patient and make the device easier to use, while maximizing therapeutic benefit to osteoporosis by localizing the repeated mechanical loads delivered to the hip and spine. Additionally, the potential to deliver WBV in a plane perpendicular to the directionality of the spine and long bones of the hip may be more beneficial than a traditional vibrating plate on which a person stands.

Additionally, a portable device, vs. a stationary device may be desired.

Finally, the existing technology of vibrating platforms limits the application of WBV to special populations that may benefit from its use. Cyclists, for example, have been shown to have lower BMD than other athletes and even lower than the BMD of sedentary people (Int J Sports Med 2012; 33:593-599). Thus, a wearable delivery system for this technology extends the reach of this tool to a wider population of individuals. Not only could a wearable device be used during cycling (or other activities), the present invention could be adapted to deliver WBV through a bicycle to the rider for the purpose of preserving BMD in cyclists.

In a separate but connected issue, WBV have been suggested to be "anabolic to the musculoskeletal system" and "in parallel, suppress adiposity" (PNAS. Nov. 6, 2007; 104(45):17879-17884). In animal models, studies have shown that low magnitude WBV can reduce stem cell adipogenesis and can provide a tool for "nonpharmacologic prevention of obesity and its sequelae" (PNAS. Nov. 6, 2007; 104(45):17879-17884). In a study done with obese women, WBV displayed a "positive effect on body weight and waist circumference reduction" (Korena J Fam Med. 2011; 32:399-405).

SUMMARY OF THE INVENTION

A wearable vibration device provides a novel method and apparatus for the stimulation of bone growth, healing of bone tissue, and prevention of osteoporosis, osteopenia, and chronic back pain. The wearable vibration device may maintain or promote bone-tissue growth, may prevent the onset of osteoporosis, and may treat chronic back pain.

Generally, one embodiment of the vibration device may comprises a motor configured to be in vibrational conductance with an area of the subject, one or more sensors in communication with the motor for receiving feedback relating to the vibrational conductance from the area of the subject, and a controller in communication with the motor. The controller may be configured to receive the feedback through the one or more sensors and determine an amount of vibrational conductance transmitted to the area of the subject such that the feedback is correlated to a fit of the motor relative to the area of the subject. Additionally, the controller may be further configured to adjust one or more parameters of the motor in response to the correlated fit until the feedback is optimized within a predetermined range for treatment.

In use, one method for positioning the vibration device against the subject, may generally comprise securing a motor to be in vibrational conductance with the area of the subject, actuating the motor to transmit vibrations to the area, sensing feedback via one or more sensors in communication with the motor relating to the vibrational conductance from the area, correlating a fit of the motor relative to the area based on the feedback, and adjusting one or more parameters of the motor in response to the correlated fit until the feedback is optimized within a predetermined range for treatment, if needed.

In some embodiments of the wearable vibration device, the device provides effective treatment by targeted application of oscillating mechanical loads to the hip and spine of a user.

The wearable vibration device allows for delivery of WBV stimulus in side-to-side, front-to-back, and/or in inferior-superior directions. This flexibility in the delivery system allows for better targeting of the hips and spine in the treatment of osteoporosis and loss of BMD. More specifically in one variation, one or more vibrating elements may be positioned against the patient's body via one or more securing mechanisms, respectively, which are configured to position the vibrating elements in a direction lateral to the individual's body such that the mechanical loads are applied laterally to the patient. The fit of the device may be monitored by various sensors and the vibrational energy may be adjusted to compensate for less than optimal fit.

In addition, a wearable device provides the user with more ambulatory options than a stationary device.

DETAILED DESCRIPTION OF THE INVENTION

Figure 1:
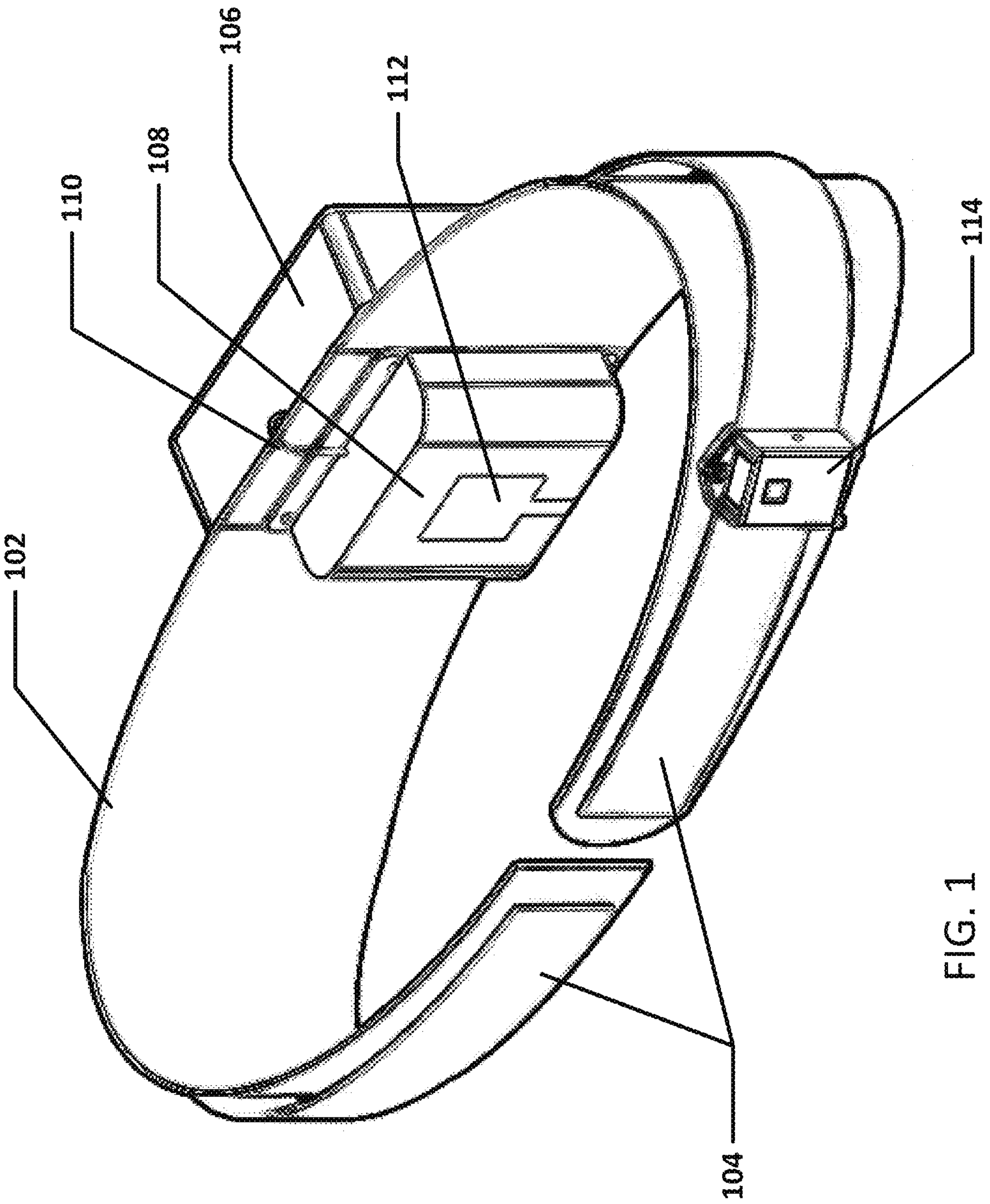
FIG. 1 shows an embodiment of the wearable vibration device.

FIG. 1 shows an embodiment of the wearable vibration device. This embodiment is designed to be worn around the waist so that the vibrational energy is applied to the user's hip/spine area. Band 102 may be secured to the body via securing mechanisms, or straps, 104. Container or enclosure 106 may contain the vibrational motor, processor, battery, battery charger, voltage regulator, buzzer or alarm, motor sensor, thermal switch and other components and/or electronics. Container 106 is secured to band 102 and connected to pressure sensor 112 via connector 110. Dampening, or foam, block, or spacer 108 serves to direct the vibrational energy more precisely toward a certain area of the user and also to increase the comfort for the user while using the wearable vibration device. Accelerometer 114 monitors the vibrational forces which are transferred through the body to determine whether the fit of the wearable vibration device is correct. The accelerometer may also assess effectiveness of the application of vibrational forces to the user. Pressure sensor 112 may also serve this purpose by determining the pressure of the device against the body. The measured pressure is indicative of the fit of the device.

It is understood that the term motor, may mean a motor which directly transmits vibrational energy to the subject, or it may be the combination of a motor driving a mechanism which in turn transmits vibrational energy to the subject.

The fit of the wearable vibration device is important to ensure proper function. For example, if the wearable vibration device is too loose or too tight on the body, the proper amount of vibrational energy may not be transferred to the bone(s), or the energy may be transferred to the wrong location, or the energy may be transferred in the wrong direction. In addition, the comfort to the user of the device may be compromised if the fit is not correct.

To ensure proper fit, the wearable vibration device may include one or more than one sensor. These sensors may include, but are not limited to: contact sensor(s), pressure sensor(s), strain gauge(s), accelerometer(s), and gyroscope (s). A sensor or sensors may be placed anywhere on the wearable vibration device, including the straps, bands, securing mechanism, motor, spacer, container etc. In addition, an alarm or alarms may be included in the wearable vibration device to alert the user to adjust the fit. Various types of alarms may be used, including audible, visible, such as a blinking light, tactile, such as a pulsing of the vibrational motor, etc. The alarm may sound for a set period of time, or until the fit is improved, or both. In addition, or alternatively, the securing mechanism of the wearable vibration device may be self-adjusting based on the feedback from the fit sensor(s). This may be achieved with a motor, a thermal mechanism, a mechanical mechanism, an electrical mechanism etc.

Alternatively or additionally, if the fit is not providing the optimal vibrational energy transfer, the processor of the wearable vibration device may adjust the movement of the motor to increase or decrease the vibrational energy being transferred to the user. In this way the optimal treatment vibrational energy may be optimized automatically even if the fit changes during the treatment.

Figure 2A:
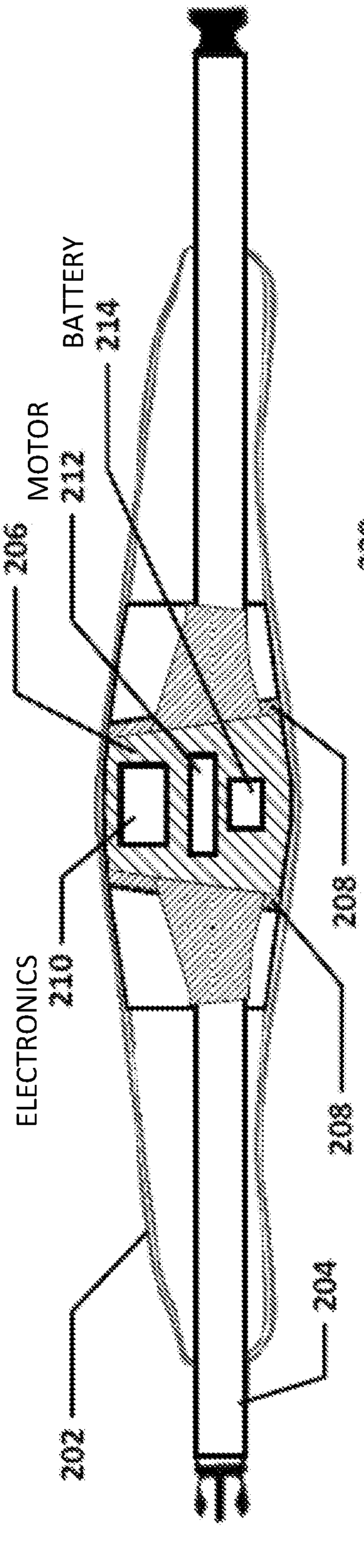
FIGS. 2A-B show various views of an embodiment of the wearable vibration device.
Figure 2B:
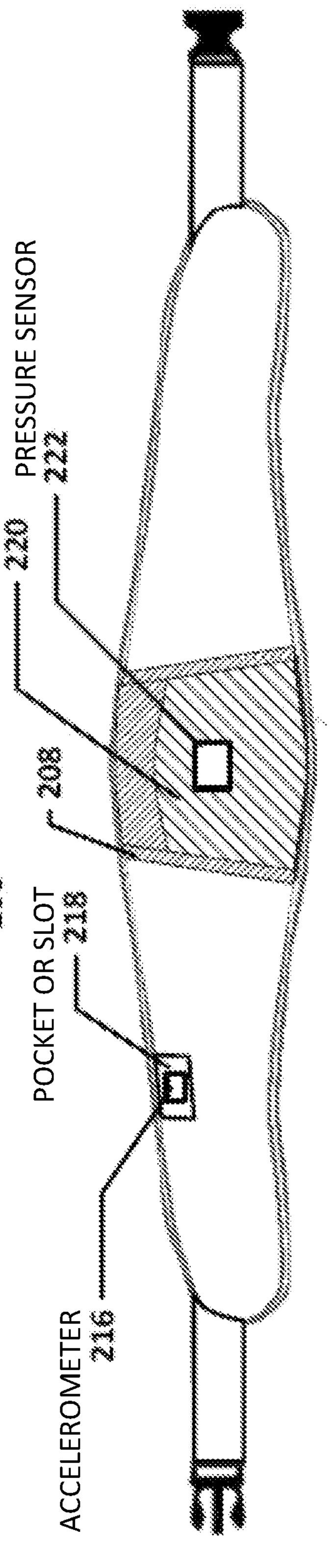

FIGS. 2A-C show various views of an embodiment of the wearable vibration device. FIG. 2A shows the side of the wearable vibration device which faces away from the user. Band 202 may be secured to the body via securing mechanisms, or straps, 204. Container, pouch, or pocket, 206 contains motor 212, electronics 210 and battery 214. Boning 208 helps hold the contents of pocket 206 securely and helps provide rigidity to the wearable vibration device.

FIG. 2B shows the side of the wearable vibration device which faces toward the user, so is in contact with the user's body. Container, pouch, or pocket 220 holds the spacer mentioned in FIG. 1. Pressure sensor 222 senses the measures the pressures caused by the vibration of the motor in pocket 206 as well as the overall tightness, or fit, of the wearable vibration device on the user's body. Pressure sensor(s) may also, or instead, be placed on other areas of the wearable vibration device. Accelerometer 216 is held in pocket, or slot, 218 and is for monitoring the fit of the wearable vibration device and/or the effectiveness of the transfer of vibrational forces to the user. One or more various sensors may be placed at various locations on the wearable vibration device to monitor the fit of the device.

Figure 3:
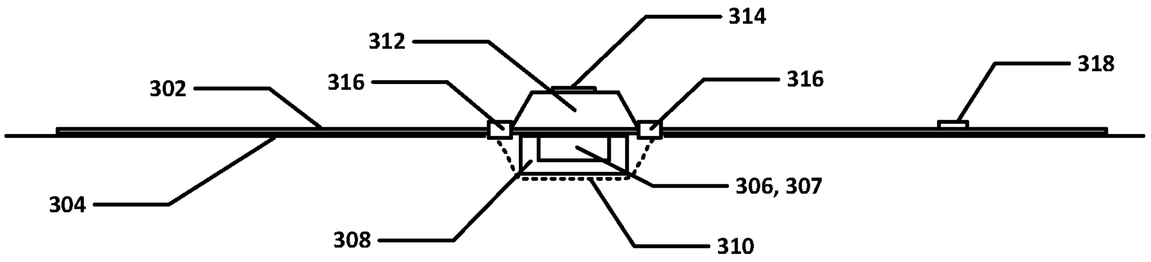
FIG. 3 shows the top view of an embodiment of the wearable vibration device.

FIG. 3 shows a top view of an embodiment of the wearable vibration device. Band 302 may be secured to the body via securing mechanisms, or straps, 304. Motor 306 and other electronics and components are contained in container 308 inside pocket 310. Spacer 312 and pressure sensor 314 are on the inside of the wearable vibration device. Boning 316 helps hold the contents of pocket 310 securely and helps provide rigidity to the wearable vibration device. Accelerometer 318 aids in monitoring the fit of the wearable vibration device and/or the effectiveness of the transfer of vibrational forces to the user.

Figures 4A, 4B, 4C:
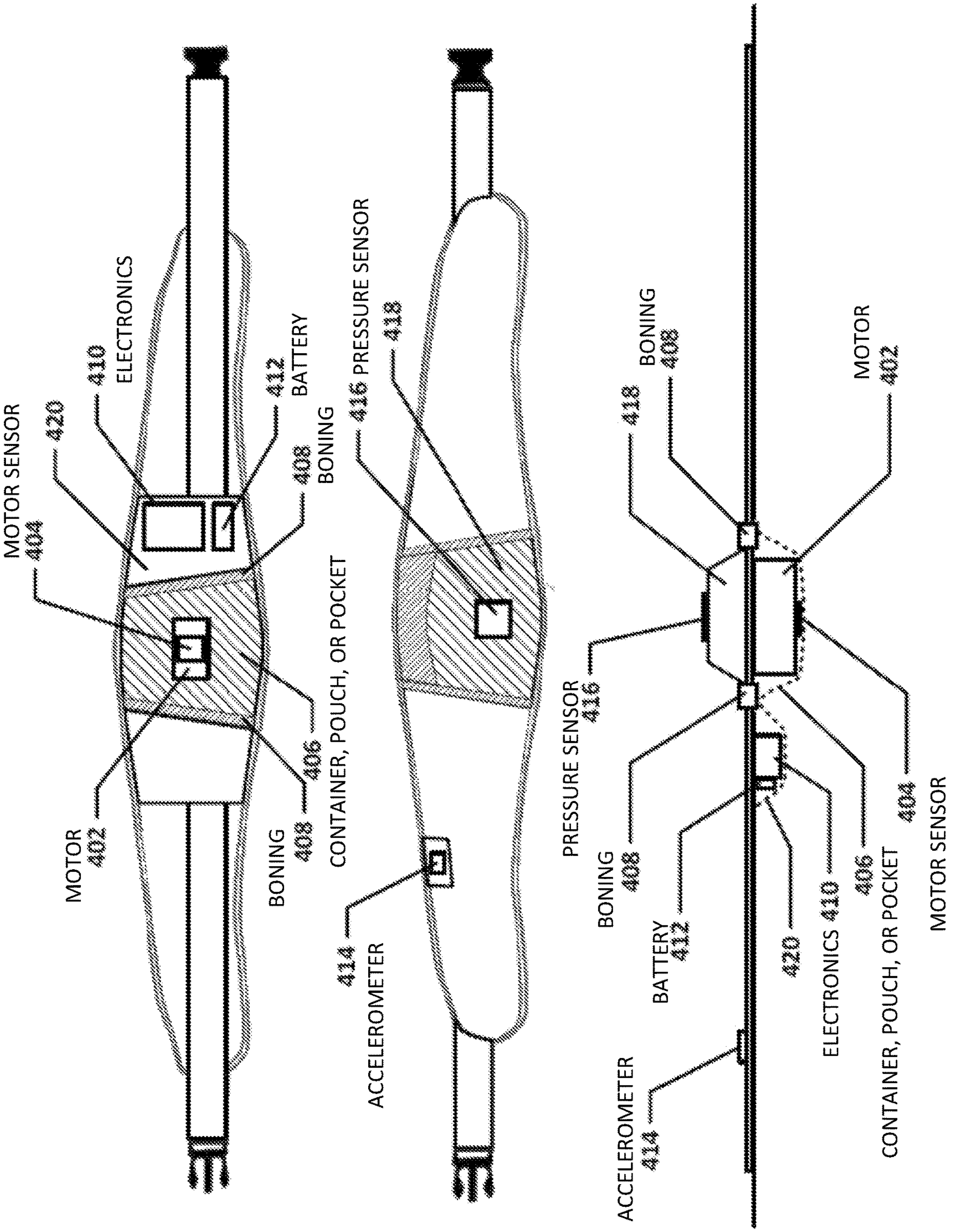
FIGS. 4A-C show various views of an embodiment of the wearable vibration device.

FIGS. 4A-C show various views of an embodiment of the wearable vibration device. FIG. 4A shows the side of the wearable vibration device which faces away from the user. Container, pouch, or pocket, 406 contains motor 402 and motor sensor 404. Pouch, or pocket, 420 contains electronics 410 and battery 412. Boning 408 helps hold the contents of pocket 406 securely and helps provide rigidity to the wearable vibration device. Accelerometer 414 aids in monitoring the fit of the wearable vibration device and/or the effectiveness of the transfer of vibrational forces to the user.

FIG. 4B shows the side of the wearable vibration device which faces toward the user, so is in contact with the user's body. Container, pouch, or pocket 418 holds the spacer mentioned in FIG. 1. Pressure sensor 416 senses the measures the pressures caused by the vibration of the motor in pocket 406 as well as the overall tightness of the wearable vibration device on the user's body. Pressure sensor(s) may also, or instead, be placed on other areas of the wearable vibration device. Accelerometer 414 is for monitoring the fit of the wearable vibration device and/or the effectiveness of the transfer of vibrational forces to the user.

FIG. 4C shows the bottom view of the device in FIGS. 4A and 4B.

Figure 5A:
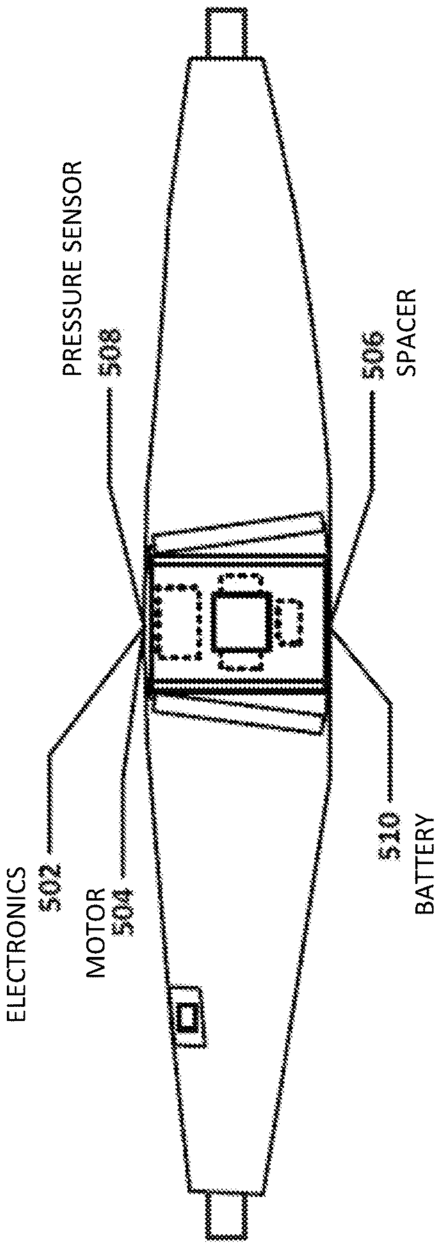
FIGS. 5A-C show various views of an embodiment of the wearable vibration device.
Figure 5B:
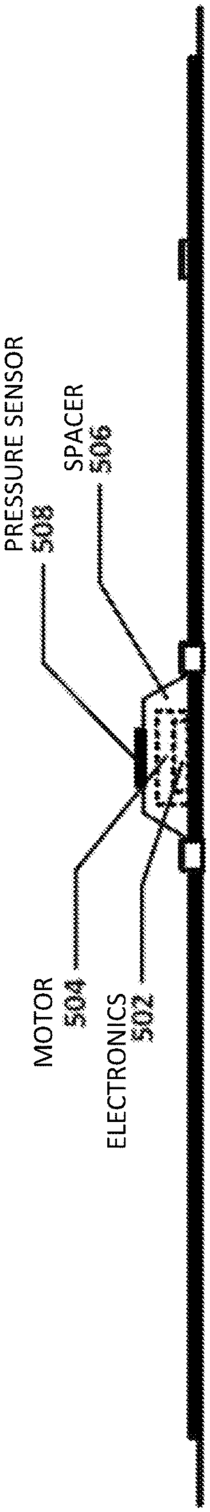
Figure 5C:
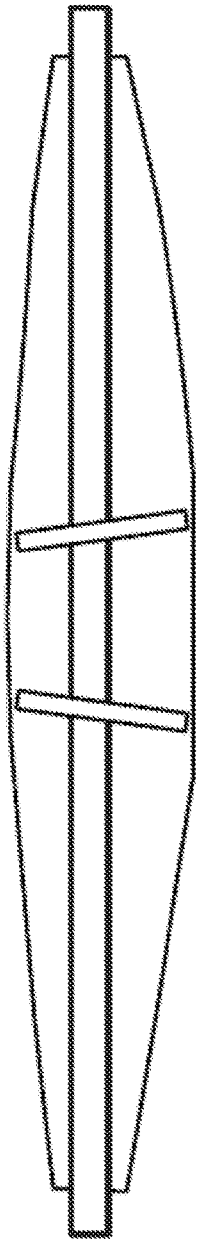

FIGS. 5A-C show various views of an embodiment of the wearable vibration device.

FIG. 5A shows the side of the wearable vibration device which faces toward the user, so is in contact with the user's body. In this embodiment spacer device 506 holds motor 504, electronics 502 and battery 510. Pressure sensor 508 is on the outside of the spacer so it is in contact with the user. Pressure sensor 508 senses the measures the pressures caused by the vibration of the motor as well as the overall tightness of the wearable vibration device on the user's body. Pressure sensor(s) may also, or instead, be placed on other areas of the wearable vibration device. This embodiment allows for a more compact device.

FIG. 5B shows the top view of the device in FIG. 5A. FIG. 5C shows the side of the wearable vibration device which faces away from the user.

Figure 6:
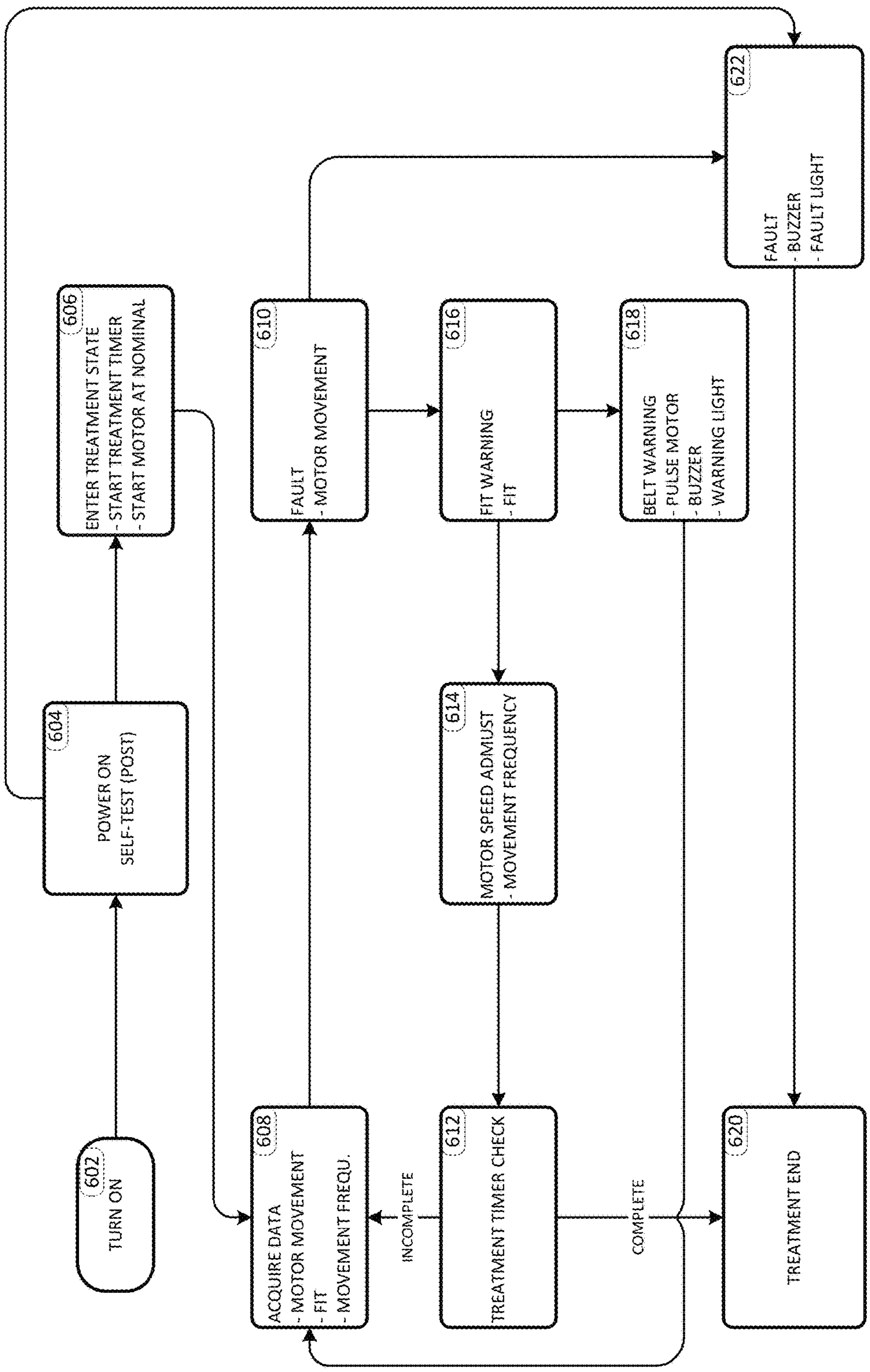
FIG. 6 shows a logical diagram of the function of an embodiment of the wearable vibration device.

FIG. 6 shows a logical diagram of the function of an embodiment of the wearable vibration device. First, the device is turned on, represented by box 602. The processor then checks for faults, represented by box 604. Several components are checked including the battery, electronic communications, and other checks. If any fault is present, the processor moves to the fault handler box 622. For example, on startup a single fault may be enough to trigger the fault handler, however during operation, more than one fault may need to occur, either consecutively or within a certain time frame, to trigger the fault handler. If no faults are present, the processor moves on to enter the treatment state, represented by box 606. Entering the treatment state includes starting the treatment timer, starting the motor at a nominal setting, and may include other processes. During the treatment state, the processor acquires data either intermittently, or continuously, such as motor movement, the fit of the device, and the movement frequency. This is represented by box 608. Fit may include feedback from one or more sensors, including, but not limited to contact sensor(s), pressure sensor(s), strain gauge(s), accelerometer(s), and gyroscope(s). Motor movement and motor frequency are determined by a motor sensor.

If the motor movement is not in the appropriate range, a motor movement fault is triggered, represented by box 610. The appropriate range may be preset and may depend on the weight, height, age, sex etc. of the user, as well as the treatment type, area, time etc. The appropriate range may also be dynamically set based on the fit of the wearable vibration device and/or other factors. A fault in the motor movement may result in an audible buzzer or alarm, a visible light and/or other alarms.

If the fit is not in the appropriate or optimal range, a fit fault or warning is triggered, represented by box 616. The appropriate range for fit may be based on feedback from any of the sensors described herein. The appropriate/optimal range for fit may be set ahead of time, or may be dynamically set based on the fit of the wearable vibration device and/or other factors. The processor may check for fit on a periodic basis. For example, if the fit check returns two or more consecutive fit faults, the fit warning handler may be triggered. Fit warning handler is represented by box 618. A fault in the fit may result in a pulse alarm, which may be generated by pulsing the vibrational motor, an audible buzzer or alarm, a visible light and/or other alarms.

After hearing, feeling, seeing or otherwise perceiving a fit alarm, the user may either adjust the fit of the wearable vibration device, or the processor may adjust the motor movement as represented in box 614, or both. The frequency, amplitude and other motor parameters may be adjusted to optimize the treatment in response to the fit warning. The motor parameter adjustment may be a continual check occurring in the regular code loop. For example, if the motor frequency changes for whatever reason (fit, movement, activity, body position, time, etc) and is outside of a predetermined window away from a predetermined frequency (30 Hz for example) for a certain timer or counter: then the motor will adjust itself to correct for the error in frequency.

As treatment proceeds, the processor continually or intermittently checks the treatment timer, represented by box 612. If the treatment time is complete, the processor moves onto to box 620 and the treatment is ended. If the treatment time is incomplete, the processor of the wearable vibration device continues the treatment, and continues acquiring motor, fit, and/or other data until the treatment ends.

Figure 7:
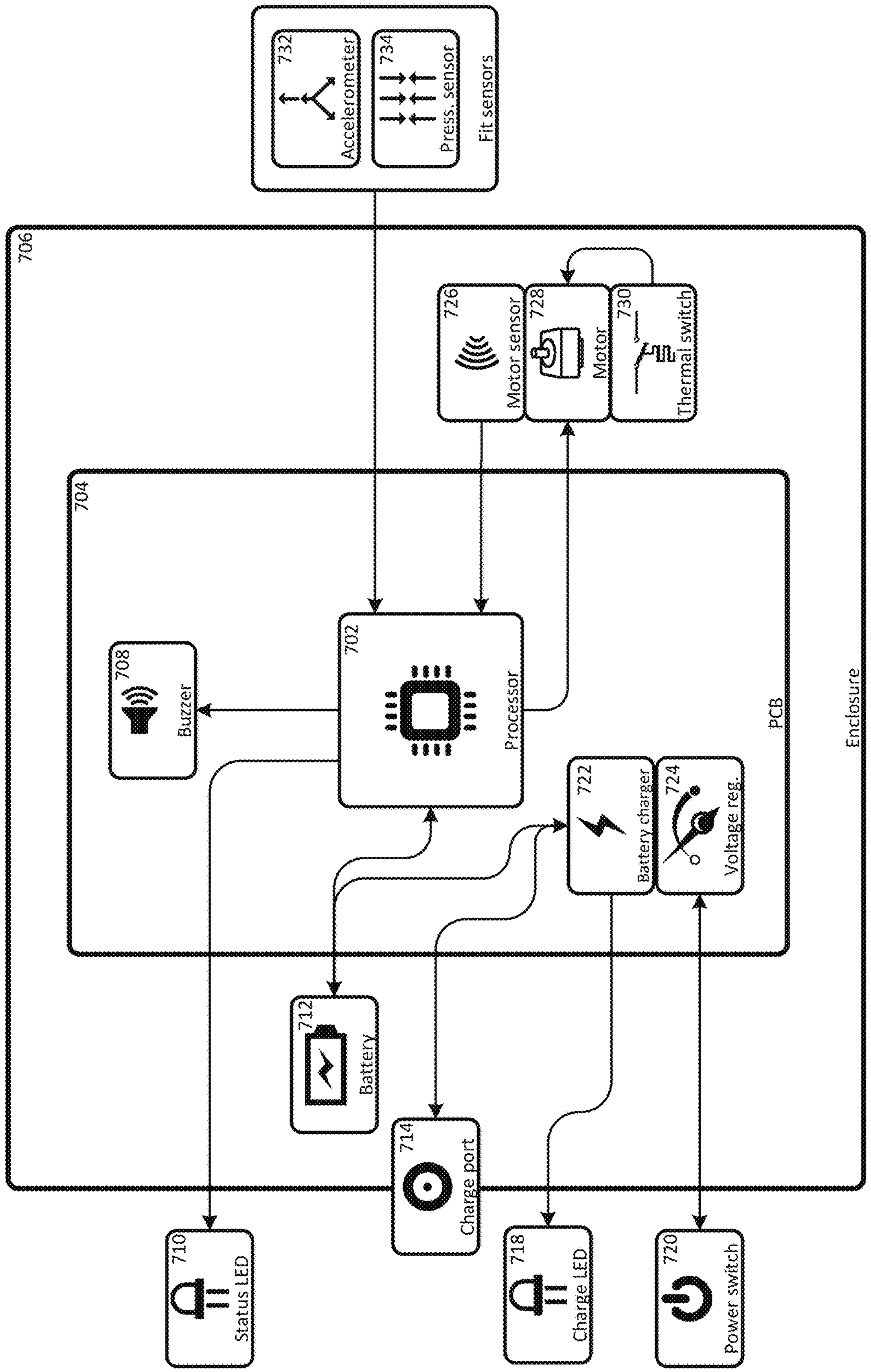
FIG. 7 shows a diagram of the various components of an embodiment of the wearable vibration device.

FIG. 7 shows a diagram of the various components of an embodiment of the wearable vibration device. Processor 702 includes the control electronics and is located on circuit board 704. The circuit board, along with other components, is within enclosure 706, for example, similar to enclosure 106 in FIG. 1. Also on the circuit board are buzzer 708, battery charger 722 and voltage regulator 724 linked to the battery. Inside the enclosure are also battery 712, motor 728, motor sensor 726 and thermal switch 730 linked to the motor. Charge port 714 is located at the enclosure or container wall so that it can be accessed and the battery charged.

Outside of the enclosure are other components including power switch 720, charge LED 718, status LED 710 and any fit sensor(s). Fit sensors may include, but are not limited to, contact sensor(s), pressure sensor(s), strain gauge(s), accelerometer(s), and gyroscope(s).

Embodiments to treat other body areas are also envisioned. For example, vibration may be delivered to the foot through a shoe or sock like device, or a device that straps, or otherwise attaches to the foot or lower limb. Vibrational stimulus delivered to the foot or lower limb may help treat osteoporosis or other ailments.

It has also been shown that vibratory noise applied to the sole of the foot may improve sensation, enhance balance, and/or reduce gait variability. The vibratory noise, or energy, may be subsensory or may be sensed by the wearer. As in other embodiments, the application of vibration may be periodic, continuous, or otherwise.

Although embodiments have been described herein, other embodiments are envisioned. For example, the wearable vibration device may be designed to be worn on other areas of the body such as the neck, back, limbs, head etc. The vibrational energy may be configured to be directed in different directions, more than one direction, alternating directions, simultaneously different directions etc. More than one vibrational motor 307 may be present in the device, allowing for more flexibility in directing vibrational energy in terms of direction, body part, etc. the vibrational energy may change with time, increasing/decreasing amplitude, increasing/decreasing frequency, changing direction, cycling through a program, turning on and off, etc. The stimulation vibration may also incorporate different kinds of waveforms. For example, square, triangle, saw tooth, sinusoidal waveforms, etc. These different waveforms may introduce harmonics of the base frequency and may provide enhanced or additional benefits. Multiple frequencies may also be superimposed on each other in the vibrating element. Multiple vibrational motors 307 may be worn on different parts of the body. Multiple wearable vibration devices may be worn. Multiple vibrational motors 307 may be used to partially or fully cancel, augment, or change the vibrational energy applied to the user. Vibrational energy may be transferred transcutaneously to an implanted metal plate. For example, the vibration device may be placed on the outer surface of the leg to vibrate a metal bone plate within the leg to reduce bone necrosis around the plate. This embodiment of the device may be used periodically, possibly once per day or once per week or once per month to reduce necrosis of the bone.

Embodiments of the wearable vibration device may be used for SI joint syndrome, SI joint arthrosis, SI joint instability, SI joint blockage, Myalgia and tendopathia in pelvic region, Pelvic ring instability, In the case of structural disturbance following lumbar spinal fusion, For prophylaxis of relapsing SI joint blockages and myotendopathia (m. rectus abdominis, m. piriformis adduktoren), Symphysis rupture and relaxation, back pain, as well as other conditions.

Figure 8:
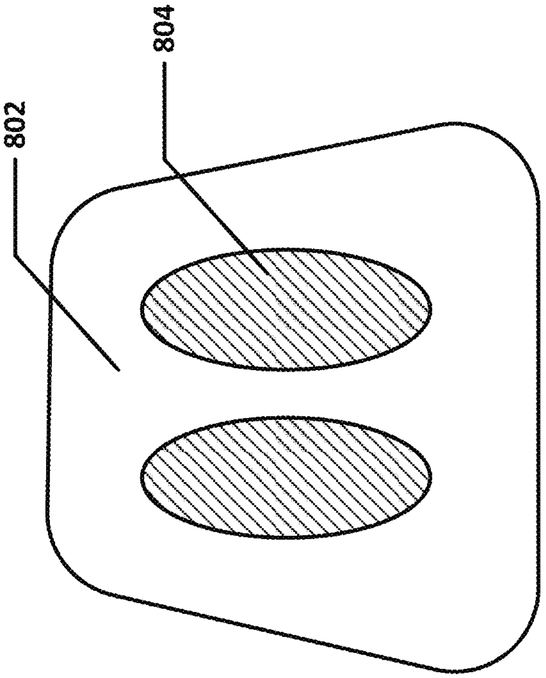
FIG. 8 shows an embodiment of the vibration device which is in the form of a seat covering.

FIG. 8 shows an embodiment of the vibration device which is in the form of a seat covering or pad. This embodiment includes the pad itself 802, which may incorporate layers of foam or other padding, and plates 804 which are connected to the controller and vibrate. The plates may be metal, polymer, or any other suitable material. Preferably, the plates are rigid or semi-rigid. The plates may be shaped in a way to "cup" the bones of the buttocks to maximize the transmission of vibrational energy from the plates to the bones. The controller may be incorporated into the pad or may be a separate device, which controls the plates wirelessly or via wired connection. The user places the seat pad/covering on a chair, or other surface, and sits on top of the seat pad, so that the area of the buttock which includes the protruding bones that make up the ischium is in contact, or near contact with the plates. The plates may have a padded covering between the plate and the user. Vibrational energy is transmitted from the plates to the ischium and to the skeleton in general to transmit the vibrational energy to the lower back and hip area. The vibrational energy may be horizontal, vertical or both, including rotational. In this embodiment, the weight of the user helps make sure the device is "fit" appropriately against the body. However, like other embodiments accelerometers may be used to assess "fit". In some embodiments, the accelerometer reading may be correlated with treatment results to determine preferred accelerometer readings. The controller may control the vibration and force of the vibration device to optimize the accelerometer readings. A strap, or other connector, may be used to help secure the pad close to the body of the user.

The vibration device may also be in the form of a back pad, similar to the one shown in FIG. 8, but meant to be placed against the back of a chair with the plate areas of the device in contact with the hip bones, for example, the iliac. In this embodiment, a strap may be included to increase the proximity of the vibration device to the hip bone area.

The vibration device may also be in the form of a weighted lap pad, with vibrational plate areas in proximity to the iliac crest areas of the hip bones.

Vibrational treatments may also be performed in forces and frequencies to treat constipation, and other digestion disorders.

Vibrational energy may be at a frequency of about 30-90 cycles per second (Hz). Other frequency ranges are also contemplated such as 1-100 HZ and other sub-ranges therein, such as, 25-35 Hz, including specific frequencies therein, such as about 10 Hz or about 4 Hz. The intensity can range from 0.01 g to 10 g (where 1.0 g=earth's gravitational field=9.8 m/s/s), and other sub-ranges therein, such as 0.01 g to 4.0 g, and specific magnitudes therein, such as about 0.3 g or about 1.0 g.

Example of Data Processing System

Figure 9:
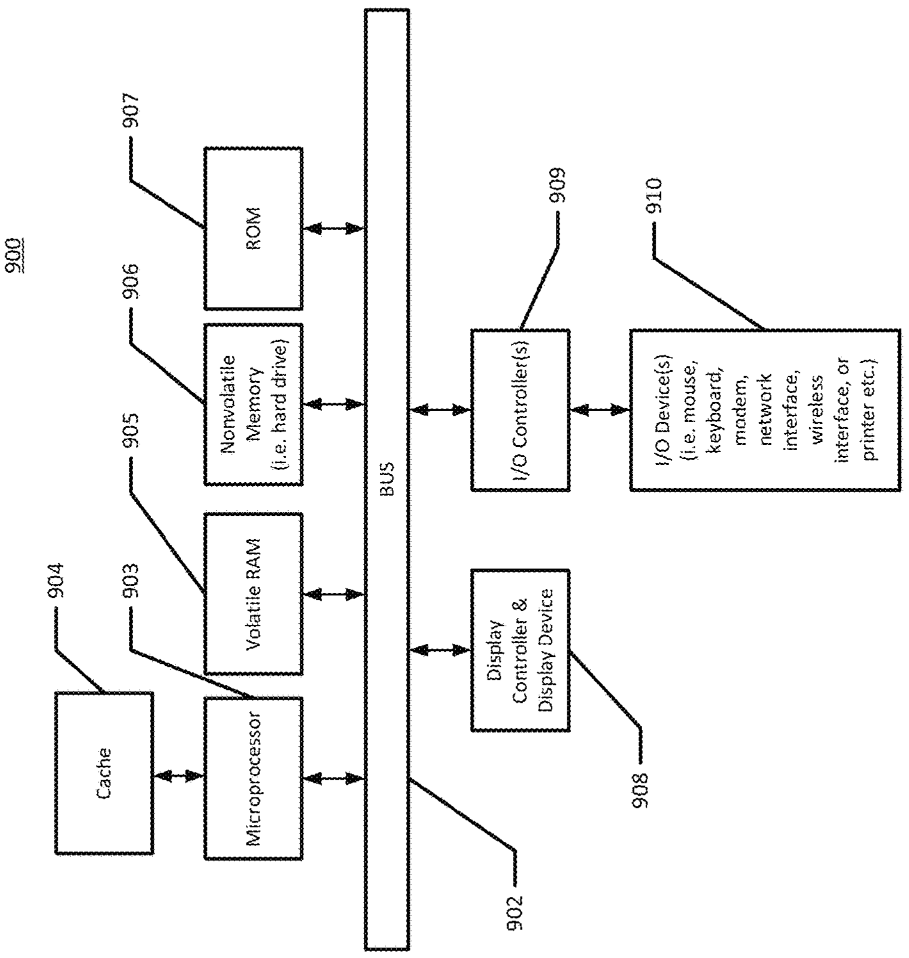
FIG. 9 is a block diagram of a data processing system, which may be used with any embodiments of the invention.

FIG. 9 is a block diagram of a data processing system, which may be used with any embodiment of the invention.

For example, the system 900 may be used as part of the processor. Note that while FIG. 9 illustrates various components of a computer system, it is not intended to represent any particular architecture or manner of interconnecting the components; as such details are not germane to the present invention. It will also be appreciated that network computers, handheld computers, mobile devices, tablets, cell phones and other data processing systems which have fewer components or perhaps more components may also be used with the present invention.

As shown in FIG. 9, the computer system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904. The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include IEEE-1394 adapter, also known as FireWire adapter, for controlling FireWire devices, SPI (serial peripheral interface), I2C (inter-integrated circuit) or UART (universal asynchronous receiver/transmitter), or any other suitable technology. Wireless communication protocols may include Wi-Fi, Bluetooth, ZigBee, near-field, cellular and other protocols.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

What is claimed is:

1. A vibration device for positioning against a subject, comprising:

a motor configured to be in vibrational contact with an area of the subject;

a support for maintaining the motor in vibrational contact with the area of the subject;

one or more motor sensors in communication and proximity with the motor for receiving a first feedback relating to one or more parameters of the motor;

an accelerometer positioned along the support for providing a second feedback relating to a fit of the motor relative to the area of the subject, wherein the accelerometer is positioned to face the subject in contact against the area such that the fit of the motor relative to the area is indicative of a tightness of the motor against the area;

a controller in communication with the motor and the accelerometer, wherein the controller is configured to receive the first feedback through the one or more motor sensors relating to motor movement or motor frequency and determine an amount of vibrational energy to be applied to the area of the subject which is sufficient for transferring the vibrational energy to bone within a body of the subject, wherein the motor, the one or more motor sensors, and the controller are contained within an enclosure worn by the subject such that the vibration device is portable when secured to the subject, and wherein the controller is further configured to adjust the one or more parameters of the motor in response to the first feedback relating to motor movement or motor frequency and further in response to the second feedback relating to the fit of the motor relative to the area of the subject until the first feedback relating to motor movement or motor frequency and the second feedback relating to the fit of the motor are adjusted to be within a predetermined range during a treatment.

2. The device of claim 1 wherein the support comprises a band configured to be secured to the subject.

3. The device of claim 1 wherein the motor is configured to transmit vibrations at a frequency of 1-100 Hz.

4. The device of claim 1 wherein the motor is configured to transmit vibrations at a frequency of 25-35 Hz.

5. The device of claim 1 wherein the motor is configured to transmit vibrations having an amplitude of 0.01 g to 10 g.

6. The device of claim 1 wherein the motor is configured to transmit vibrations having an amplitude of 0.01 g to 4.0 g.

7. The device of claim 1 wherein an additional sensor comprises a pressure sensor for determining a pressure of the vibrational contact upon the area of the subject.

8. The device of claim 1 wherein the second feedback from the accelerometer is used by the controller for determining the vibrational energy applied to the area of the subject.

9. The device of claim 1 wherein an additional sensor is selected from the group consisting of contact sensors, strain gauges, and gyroscopes.

10. The device of claim 1 wherein the controller is further configured to provide a signal to adjust the support in response to the second feedback.

11. The device of claim 10 further comprising a second motor or actuator which is actuated via a thermal, mechanical, or electrical mechanism.

12. The device of claim 1 wherein the predetermined range is dynamically adjustable based on the first feedback received from an additional sensor.

13. The device of claim 1 wherein the predetermined range is preset based on one or more parameters of the subject selected from the group consisting of weight, height, age, sex, area to be treated, and time of treatment.

14. The device of claim 1 wherein the device is configured to be worn by the subject against the area.

15. The device of claim 14 wherein the device is configured to be positioned against a hip or spine of the subject.

16. The device of claim 1 further comprising an indicator which is configured to alert the subject to adjust the device against the area.

17. The device of claim 1 wherein the controller is configured to receive the first feedback from the one or more motor sensors intermittently or continuously.

18. The device of claim 1 further comprising a spacer in communication with the motor and configured for directing vibrations into the area of the subject, wherein the spacer is maintained relative to the motor and is configured to dampen the vibrations.

19. The device of claim 18 wherein the spacer is comprised of foam.

20. A method of positioning a vibration device against a subject, comprising:

securing a motor on a support to be in vibrational contact with an area of the subject;

actuating the motor to transmit vibrational energy to the area;

sensing a first feedback via one or more motor sensors in communication and proximity with the motor and also in communication with a controller, wherein the one or more motor sensors are configured for sensing one or more parameters of the motor relating to motor movement or motor frequency;

sensing a second feedback via an accelerometer positioned along the support for providing a second feedback relating to a fit of the motor relative to the area of the subject, wherein the accelerometer is positioned to face the subject in contact against the area such that the fit of the motor relative to the area is indicative of a tightness of the motor against the area;

adjusting the fit of the motor relative to the area based on the first feedback and the second feedback, wherein the motor, the one or more motor sensors, and the controller are contained within an enclosure worn by the subject such that the vibration device is portable when secured to the subject;

determining an amount of the vibrational energy which is sufficient for transferring the vibrational energy to bone within a body of the subject; and adjusting one or more parameters of the motor via the controller in response to the first feedback relating to motor movement or motor frequency and further in response to the second feedback relating to the fit of the motor relative to the area of the subject until the first feedback relating to motor movement or motor frequency and the second feedback relating to the fit of the motor are adjusted to be within a predetermined range during a treatment.

21. The method of claim 20 wherein securing the motor to be in vibrational contact comprises positioning the motor against the area via a band secured to the subject.

22. The method of claim 20 wherein securing the motor to be in vibrational contact comprises positioning the motor against a hip or spine of the subject.

23. The method of claim 20 wherein securing the motor to be in vibrational contact comprises positioning the motor against a foot or lower limb of the subject.

24. The method of claim 20 wherein actuating the motor to transmit vibrational energy comprises transmitting vibrations at a frequency of 1-100 Hz.

25. The method of claim 20 wherein actuating the motor to transmit vibrational energy comprises transmitting vibrations at a frequency of 25-35 Hz.

26. The method of claim 20 wherein actuating the motor to transmit vibrational energy comprises transmitting vibrations having an amplitude of 0.01 g to 10 g.

27. The method of claim 20 wherein actuating the motor to transmit vibrational energy comprises transmitting vibrational energy having an amplitude of 0.01 g to 4.0 g.

28. The method of claim 20 wherein sensing the first feedback via one or more motor sensors comprises sensing a pressure of the vibrational contact via one or more pressure sensors upon the area of the subject.

29. The method of claim 20 wherein sensing the first feedback via one or more motor sensors comprises sensing the vibrational energy via one or more additional accelerometers upon the area of the subject.

30. The method of claim 20 wherein sensing the first feedback via one or more motor sensors comprises receiving the first feedback from the one or more motor sensors intermittently or continuously.

31. The method of claim 20 wherein adjusting the one or more parameters of the motor via the controller comprises automatically adjusting via the controller in communication with the motor an amount of vibrational energy transmitted to the area of the subject in response to the first feedback.

32. The method of claim 31 further comprising actuating a second motor or actuator which is actuated via a thermal, mechanical, or electrical mechanism.

33. The method of claim 31 wherein adjusting the amount of the vibrational energy comprises adjusting the fit of the motor against the area of the subject based upon a periodic check of the fit.

34. The method of claim 20 wherein the predetermined range is preset based on one or more parameters of the subject selected from the group consisting of weight, height, age, sex, area to be treated, and time of treatment.

35. The method of claim 20 further comprising alerting the subject via an alarm to adjust the fit of the device against the area.

36. The method of claim 20 wherein the vibration device further comprises a spacer in communication with the motor and configured for directing vibrations into the area is maintained relative to the motor and is configured to dampen the vibrations.

37. The method of claim 36 wherein the spacer is comprised of foam.

* * * * *